US012660734B2

(12) United States Patent

Schroeder

(10) Patent No.: US 12,660,734 B2

(45) Date of Patent: Jun. 23, 2026

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 508 days.

(21) Appl. No.: 18/143,852

(22) Filed: May 5, 2023

(65) Prior Publication Data

US 2024/0365697 A1     Nov. 7, 2024

(51) Int. Cl.
A01B 79/00          (2006.01)
A01B 63/00          (2006.01)

(52) U.S. Cl.
CPC .......... A01B 79/005 (2013.01); A01B 63/008 (2013.01)

(58) Field of Classification Search
CPC ............................ A01B 79/005; A01B 63/008
USPC .......................................................... 701/50
See application file for complete search history.

(56) References Cited

U.S. PATENT DOCUMENTS

| | | | |
|---|---|---|---|
| 5,442,552 A | 8/1995 | Slaughter et al. | |
| 6,253,136 B1 * | 6/2001 | Stratton .................... | E02F 9/22 172/3 |

| | | | |
|---|---|---|---|
| 10,255,670 B1 * | 4/2019 | Wu ......................... | H04N 7/183 |
| 10,462,957 B2 | 11/2019 | Clement et al. | |
| 11,360,984 B1 * | 6/2022 | Zicari ............... | G06F 16/24568 |
| 11,445,656 B2 | 9/2022 | Smith | |
| 2018/0168094 A1 * | 6/2018 | Koch ...................... | A01C 5/064 |
| 2019/0090432 A1 * | 3/2019 | Duquette ............... | G06Q 10/06 |
| 2019/0104947 A1 * | 4/2019 | Shigemori ............. | A61B 5/352 |
| 2020/0107490 A1 * | 4/2020 | Zemenchik ........... | A01B 63/111 |
| 2020/0329627 A1 * | 10/2020 | Johnson ............... | A01B 49/027 |
| 2020/0344939 A1 * | 11/2020 | Sporrer ................. | H04N 23/54 |
| 2020/0352088 A1 * | 11/2020 | Arnett .................... | A01C 7/203 |
| 2021/0015039 A1 | 1/2021 | Vandike et al. | |
| 2021/0015045 A1 | 1/2021 | Vandike et al. | |
| 2021/0034867 A1 | 2/2021 | Ferrari et al. | |
| 2021/0137006 A1 | 5/2021 | Shearer et al. | |

(Continued)

FOREIGN PATENT DOCUMENTS

| | | |
|---|---|---|
| CN | 201222876 U | 4/2009 |
| CN | 109937685 A | 6/2019 |

(Continued)

*Primary Examiner* — Krishnan Ramesh

(74) *Attorney, Agent, or Firm* — Dority & Manning, P.A.

(57) ABSTRACT

A system for controlling the operation of an agricultural implement includes a disk blade configured to rotate relative to soil in a field across which the agricultural implement is traveling. Moreover, the system includes a computing system configured to access a map identifying a length parameter at a plurality of locations within the field. The length parameter is, in turn, associated with one or more corn stalks that have been severed from a corresponding root ball and are present on a surface of a portion of the field. In addition, the computing system is configured to receive location sensor data indicative of a current location of the agricultural implement within the field and control an operating parameter of the disk blade based on the accessed map and the received location sensor data.

16 Claims, 8 Drawing Sheets

400

402
Access a map identifying a length parameter at a plurality of locations within a field, the length parameter being assiciated with one or more corn stalks that have been severed from a corresponding root ball and are present on a surface of a portion of the field 404
Receive location sensor data indicative of a current location of an agricultural implement within the field 406
Control an operating parameter of a disk blade of the agricultural implement based on the accessed map and the received location sensor data

(56)     References Cited

U.S. PATENT DOCUMENTS

| | | | |
|---|---|---|---|
| 2021/0158041 A1* | 5/2021 | Chowdhary | G06V 20/188 |
| 2021/0259148 A1 | 8/2021 | Schmidt | |
| 2021/0289701 A1 | 9/2021 | White et al. | |
| 2021/0307228 A1 | 10/2021 | Egelund et al. | |
| 2022/0101554 A1* | 3/2022 | Fu | G06V 10/82 |
| 2022/0110253 A1* | 4/2022 | Anderson | A01B 79/005 |
| 2022/0110262 A1 | 4/2022 | Vandike et al. | |
| 2022/0117215 A1* | 4/2022 | Sibley | A01M 21/00 |
| 2022/0262027 A1* | 8/2022 | Henry | G06V 20/56 |
| 2022/0264783 A1* | 8/2022 | Johnson | A01B 71/08 |
| 2023/0050483 A1* | 2/2023 | Bout | B60C 23/0416 |
| 2023/0090714 A1* | 3/2023 | Long | A01B 76/00 |
| | | | 701/25 |
| 2023/0165181 A1* | 6/2023 | Scheiner | G06Q 50/02 |
| | | | 47/1.41 |
| 2023/0309439 A1* | 10/2023 | Yarimizu | G06T 7/0014 |
| 2023/0341586 A1* | 10/2023 | Upasani | G01W 1/10 |
| 2024/0206365 A1* | 6/2024 | Pothen | A01B 79/02 |
| 2024/0260499 A1* | 8/2024 | Kremesec | A01B 79/005 |

FOREIGN PATENT DOCUMENTS

| | | | |
|---|---|---|---|
| DE | 2654141 A1 | 6/1978 | |
| DE | 102019119290 A1 | 1/2021 | |
| EP | 0260113 A2 | 3/1988 | |
| EP | 3981232 A1 | 4/2022 | |
| WO | WO 2017/049186 A1 | 3/2017 | |

* cited by examiner

300

302 — Receive image data

304 — Receive location sensor data

306 — Identify residue pieces

308 — Classify residue pieces

310 — Determine length of residue classified as corn stalks

312 — Disregard residue classified as leaves

314 — Determine length parameter(s)

316 — Generate map

318 — Store map

320 — Access map

322 — Receive location sensor data

324 — Control operating parameter(s)

400

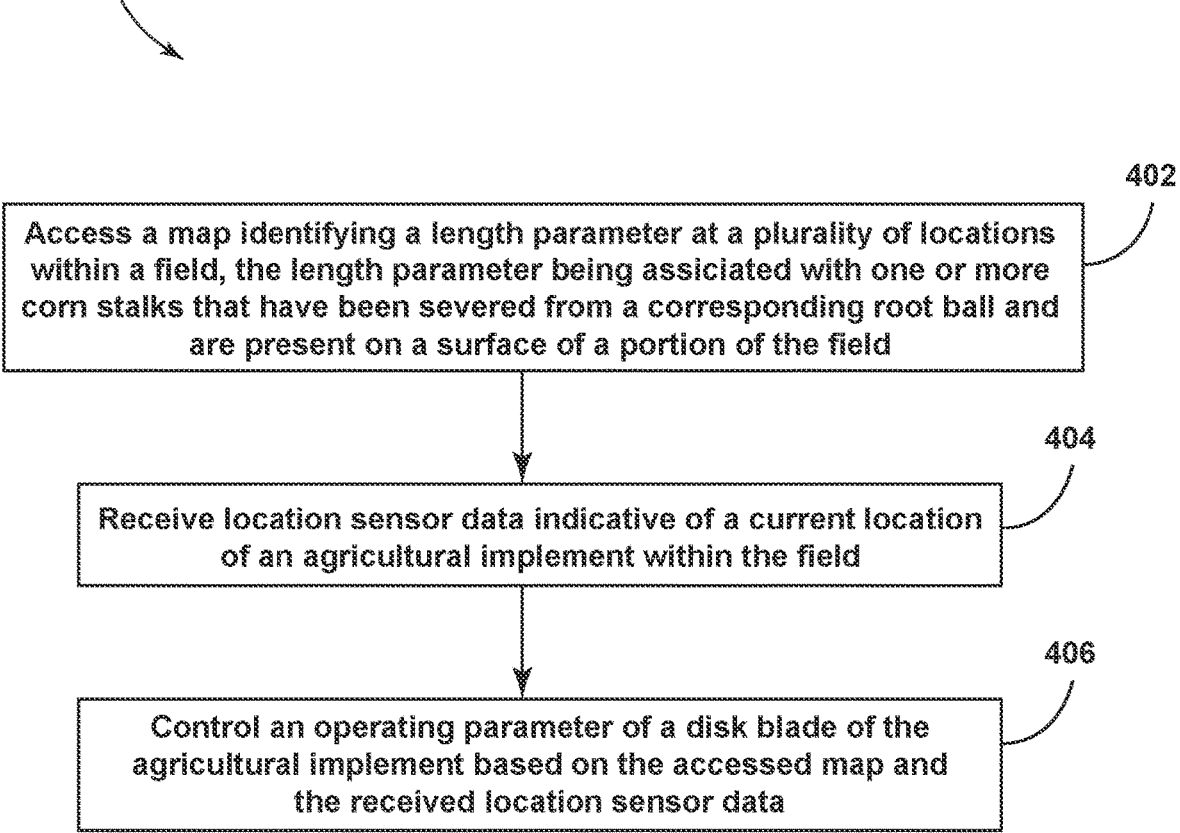

402

Access a map identifying a length parameter at a plurality of locations within a field, the length parameter being assiciated with one or more corn stalks that have been severed from a corresponding root ball and are present on a surface of a portion of the field

404

Receive location sensor data indicative of a current location of an agricultural implement within the field

406

Control an operating parameter of a disk blade of the agricultural implement based on the accessed map and the received location sensor data

FIG. 8

SYSTEM AND METHOD FOR CONTROLLING THE OPERATION OF AN AGRICULTURAL IMPLEMENT

FIELD OF THE INVENTION

The resent disclosure generally relates to agricultural implements and, more particularly, to systems and methods for controlling the operation of an agricultural implement.

BACKGROUND OF THE INVENTION

It is well known that, to attain the best agricultural performance from a field, a farmer must cultivate the soil, typically through a tillage operation. Modern farmers perform tillage operations by pulling an agricultural implement, such as a tillage implement, behind an agricultural work vehicle, such as a tractor. For example, tillage implements generally include ground-engaging tillage tools, such as shanks, disk blades, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

As the agricultural implement travels across the field, the implement may encounter varying field conditions. For example, the size, type, and/or amount of residue present on the surface of the field may vary. In this respect, systems for controlling or otherwise adjusting the operation of an agricultural implement during an agricultural operation have been developed. While such systems work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a disk blade supported on the frame, with the disk blade configured to rotate relative to soil in a field across which the agricultural implement is traveling. Furthermore, the agricultural implement includes a computing system configured to access a map identifying a length parameter at a plurality of locations within the field. The length parameter is, in turn, associated with one or more corn stalks that have been severed from a corresponding root ball and are present on a surface of a portion of the field. Additionally, the computing system is configured to receive location sensor data indicative of a current location of the agricultural implement within the field and control an operating parameter of the disk blade based on the accessed map and the received location sensor data.

In another aspect, the present subject matter is directed to a system for controlling an operation of an agricultural implement. The system includes a disk blade configured to rotate relative to soil in a field across which the agricultural implement is traveling. Moreover, the system includes a computing system configured to access a map identifying a length parameter at a plurality of locations within the field. The length parameter is, in turn, associated with one or more corn stalks that have been severed from a corresponding root ball and are present on a surface of a portion of the field. In addition, the computing system is configured to receive location sensor data indicative of a current location of the agricultural implement within the field and control an operating parameter of the disk blade based on the accessed map and the received location sensor data.

In a further aspect, the present subject matter is directed to a method for controlling an operation of an agricultural implement. The agricultural implement, in turn, includes a disk blade configured to rotate relative to soil in a field across with the tillage implement is traveling. The method includes accessing, with a computing system, a map identifying a length parameter at a plurality of locations within the field. The length parameter is, in turn, associated with one or more corn stalks that have been severed from a corresponding root ball and are present on a surface of a portion of the field. Furthermore, the method includes receiving, with the computing system, location sensor data indicative of a current location of the agricultural implement within the field. Additionally, the method includes controlling, with the computing system, an operating parameter of the disk blade based on the accessed map and the received location sensor data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 8 illustrates a flow diagram of one embodiment of a method for controlling the operation of an agricultural implement in accordance with aspects of the present subject matter.

Figure 1:
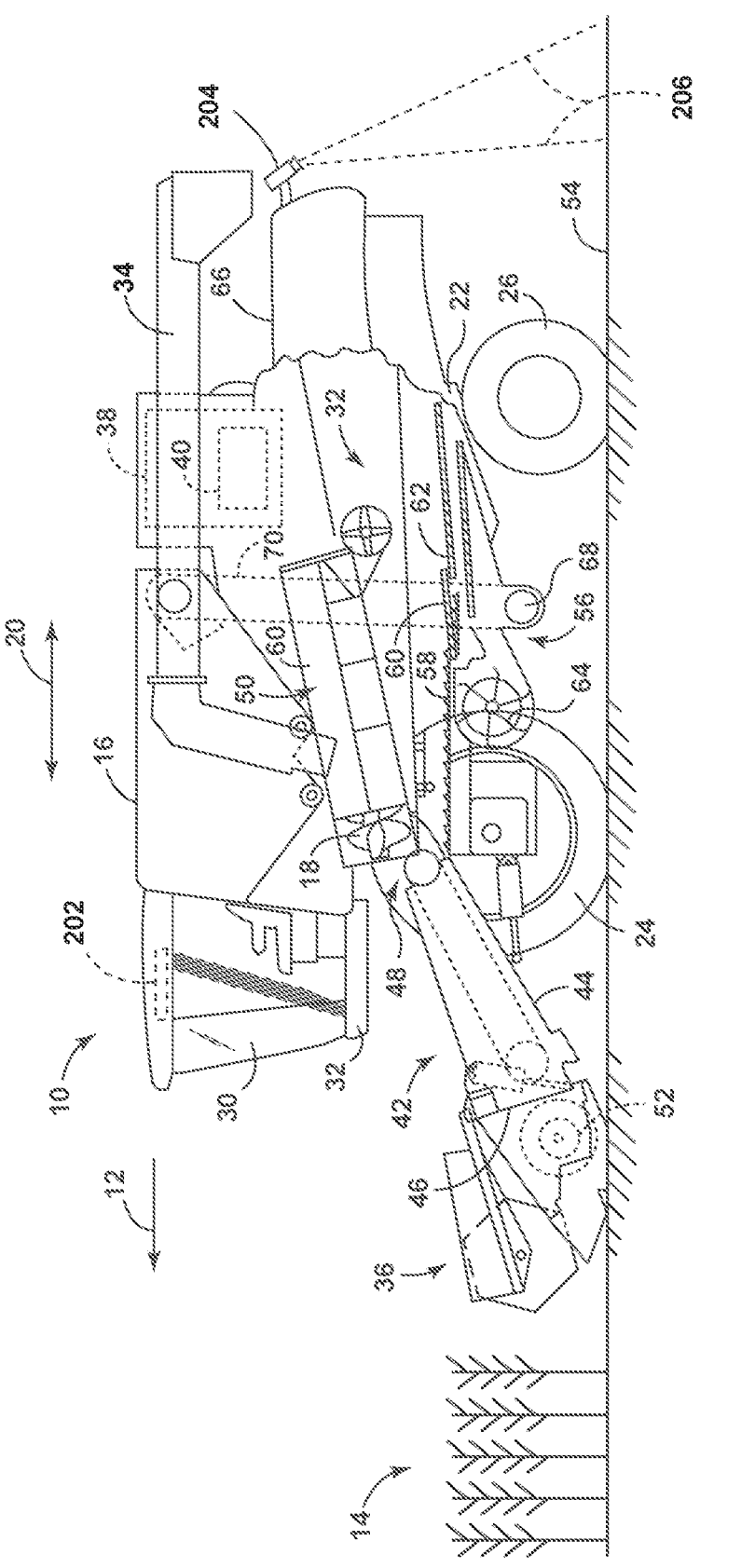
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural implement, such as a tillage implement or a seed-planting implement. As will be described below, the agricultural implement includes one or more disk blades. Each disk blade is, in turn, configured to rotate relative to the soil in the field across which the agricultural implement is traveling. For example, in some embodiments, the disk blade(s) may be configured to cut and size the residue present on the surface of the field.

In several embodiments, a computing system of the disclosed system is configured to control the operation of the disk blade(s) based on the corn stalks present on the surface of the field. More specifically, the computing system is configured to access a map identifying a length parameter at a plurality of locations within the field. Each length parameter is, in turn, associated with corn stalks that have been severed from a corresponding root ball and are present on the surface of a portion of the field forward of the implement and encompassing the operating width of the implement. For example, the map is generated based on image data depicting the field that was captured during a previous agricultural operation, such as a harvesting operation. Furthermore, the computing system is configured to receive location sensor data indicative of the current location of the agricultural implement within the field. Additionally, the computing system is configured to control one or more operating parameters of the disk blade(s) based on the accessed map and the received location sensor data. Such operating parameter(s) may, in turn, include the force(s) being applied to the disk blade(s), the penetration depth(s) of the disk blade(s), and/or the position(s) of the disk blade(s) relative to the frame of the implement.

Controlling the operation of the disk blades of an agricultural implement based on the lengths of the corn stalks that have been severed from their root balls and present on the surface of the field improves the operation of the implement. More specifically, unlike many other types of residue, such as leaves, straw (e.g., wheat straw), stubble, and/or the like, long corn stalks that have been severed from their root balls and are present on the surface of the field are particularly prone to interfering with the operation of the disk blades. For example, such long corn stalks can become wrapped around hangers (e.g., C-hangers), disk gang shafts, and other components or tools of the implement in a manner that can slow or prevent rotation of the associated disk blades. In this respect, and as described above, the disclosed system and method can adjust the operating parameters of the disk blades based on the lengths of the corn stalks present within the field. Such adjustments, in turn, can reduce the lengths of the corn stalks and, thus, the likelihood that the corn stalks interfere with the operation of the disk blades.

Referring now to the drawings, FIG. 1 illustrates a partial sectional side view of one embodiment of an agricultural harvester 10 in accordance with aspects of the present subject matter. As such, the agricultural harvester 10 is configured to travel across a field in a forward direction of travel (indicated by arrow 12) to harvest a standing crop 14 present within the field. While traversing the field, the agricultural harvester 10 is configured to process the harvested material and store the grain, seed, or the like within a crop tank 16 of the agricultural harvester 10. However, in other embodiments, the agricultural harvester 10 may be configured as any other suitable type of agricultural harvester.

Furthermore, in the illustrated embodiment, the agricultural harvester 10 is configured as an axial-flow type combine in which the harvested crop material is threshed and separated while being advanced by and along a rotor 18 extending in an axial direction 20. However, in alternative embodiments, the agricultural harvester 10 may have any other suitable harvester configuration, such as a traverse-flow type configuration in which the rotor extends in a lateral direction or a sugar cane harvester.

The agricultural harvester 10 includes a chassis or frame 22 configured to support and/or couple to various components of the agricultural harvester 10. For example, in several embodiments, the agricultural harvester 10 may include a pair of driven, front wheels 24 and a pair of steerable, rear wheels 26 coupled to the chassis 22. As such, the wheels 24, 26 may be configured to support the agricultural harvester 10 relative to the ground and move the agricultural harvester 10 in the forward direction of travel 12.

Furthermore, the agricultural harvester 10 may include an operator's platform 28 having an operator's cab 30, a crop processing system 32, the crop tank 16, and a crop unloading tube 34 supported by the chassis 22. As will be described below, the crop processing system 32 may be configured to perform various processing operations on the harvested material as the crop processing system 32 transfers the harvested material from a harvesting implement 36 (e.g., a header) of the agricultural harvester 10 and through the agricultural harvester 10.

Moreover, the agricultural harvester 10 may include an engine 38 and a transmission 40 mounted on the chassis 22. The transmission 40 may be operably coupled to the engine 38 and may provide variably adjusted gear ratios for transferring engine power to the wheels 24 via a drive axle assembly (or via axles if multiple drive axles are employed).

Additionally, as shown in FIG. 1, the agricultural harvester 10 includes a feeder 42 that couples to and supports the harvesting implement 36. More specifically, the feeder 42 may include a feeder housing 44 extending from a forward end 46 to an aft end 48. The forward end 46 of the feeder housing 44 may, in turn, be coupled to harvesting implement 36. Moreover, the aft end 48 of the feeder housing 44 may be pivotably coupled to the chassis 22 adjacent to a threshing and separating assembly 50 of the crop processing system 32. Such a pivotable coupling may permit movement of the harvesting implement 36 relative to the field surface in the vertical direction.

As the agricultural harvester 10 is propelled in the forward direction of travel 12 over the field with the standing crop 14, the material is severed from the stubble by a cutter bar (not shown) positioned at the front of the harvesting implement 36. The harvested material is delivered by a header conveyance device 52 (e.g., an auger, belt, chain, etc.) to the forward end 46 of the feeder housing 44, which supplies the harvested crop material to the threshing and separating assembly 50. In general, the threshing and separating assembly 50 may include a cylindrical chamber 54 in which the rotor 18 is rotated to thresh and separate the harvested material received therein. That is, the harvested material is rubbed and beaten between the rotor 18 and the inner surfaces of the chamber 54 to loosen and separate the grain, seed, or the like from the remaining crop material.

The material separated by the threshing and separating assembly 50 may fall onto a cleaning assembly 56 of the crop processing system 32. As will be described below, the cleaning assembly 56 may include a series of oscillating components, such as one or more pans 58, pre-sieves 60, and/or sieves 62, that are configured to oscillate relative to the frame 22. As such, the separated material may be spread out via the oscillation of such components 58, 60, 62 and the grain, seeds, or the like may eventually fall through apertures defined by the sieve(s) 62. Additionally, a cleaning fan 64 may be positioned adjacent to one or more of the pre-sieve(s) 60 and the sieve(s) 62 to provide an air flow through that removes chaff and other impurities from the material present thereon. The impurities may be discharged from the agricultural harvester 10 through the outlet of a discharge hood 66 positioned at the aft end of the agricultural harvester 10. The cleaned harvested crop passing through the sieve(s) 62 may then fall into a trough of an auger 68, which may transfer the harvested crop to an elevator 70 for delivery to the crop tank 16.

It should be further appreciated that the configuration of the agricultural harvester 10 described above and shown in FIG. 1 is provided only to place the present subject matter in an exemplary field of use. Thus, it should be appreciated that the present subject matter may be readily adaptable to any manner of agricultural harvester configuration.

Furthermore, the harvester location sensor 202 may be provided in operative association with the agricultural harvester 10. In general, the harvester location sensor 202 may be configured to determine the current location of the agricultural harvester 10 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 202 may be transmitted to a computing system associated with the agricultural harvester 10 (e.g., in the form coordinates) and stored within the computing system's memory for subsequent processing and/or analysis. For instance, the determined location from the harvester location sensor 202 may be used to geo-locate the agricultural harvester 10 within the field.

Moreover, the agricultural harvester 10 may include one or more imaging devices 204 coupled thereto and/or supported thereon. More specifically, the imaging device(s) 204 is configured to generate image data depicting a portion of the field present within its field of view 206 (e.g., as indicated by dashed lines 206 in FIG. 1) as the agricultural harvester 10 moves across the field in the travel direction 12. As will be described below, the image data generated by the imaging device(s) 204 is analyzed to identify the lengths of the corn stalks depicted therein. Such length data is subsequently used in controlling one or more operating parameters of an agricultural implement (e.g., a tillage implement) performing a subsequent agricultural operation (e.g., a tillage operation) on the field.

In general, the imaging device(s) 204 may correspond to any suitable sensing devices configured to generate image data or image-like data depicting the surface of the field. Specifically, in several embodiments, the imaging device(s) 204 may correspond to a suitable camera(s) configured to capture images of the soil surface of the field present within the field of view 206, thereby allowing the lengths of the corn stalks present on the surface of the field to be determined by analyzing the content of each image. For instance, in a particular embodiment, each imaging device(s) 204 may correspond to a stereographic camera(s) having two or more lenses with a separate image sensor for each lens to allow the cameras to capture stereographic or three-dimensional images. Alternatively, the imaging device(s) 204 may correspond to any other suitable devices for generating image data or image-like data, such as a monocular camera(s), a LiDAR device(s), a RADAR device(s), and/or the like.

The imaging device(s) 204 may be mounted at any suitable location(s) on the agricultural harvester 10 that allows the imaging device(s) 204 to generate image data depicting a portion(s) of the field after the harvesting operation has been performed. For example, in the illustrated embodiment, an imaging device 204 is mounted on the aft end of the agricultural harvester 10 such that the imaging device 204 has a field of view directed at a portion of the field aft of the agricultural harvester 10. However, in alternative embodiments, include any other suitable number of imaging devices 204 and/or such imaging device(s) 204 may be mounted at any other suitable location(s).

Figure 2:
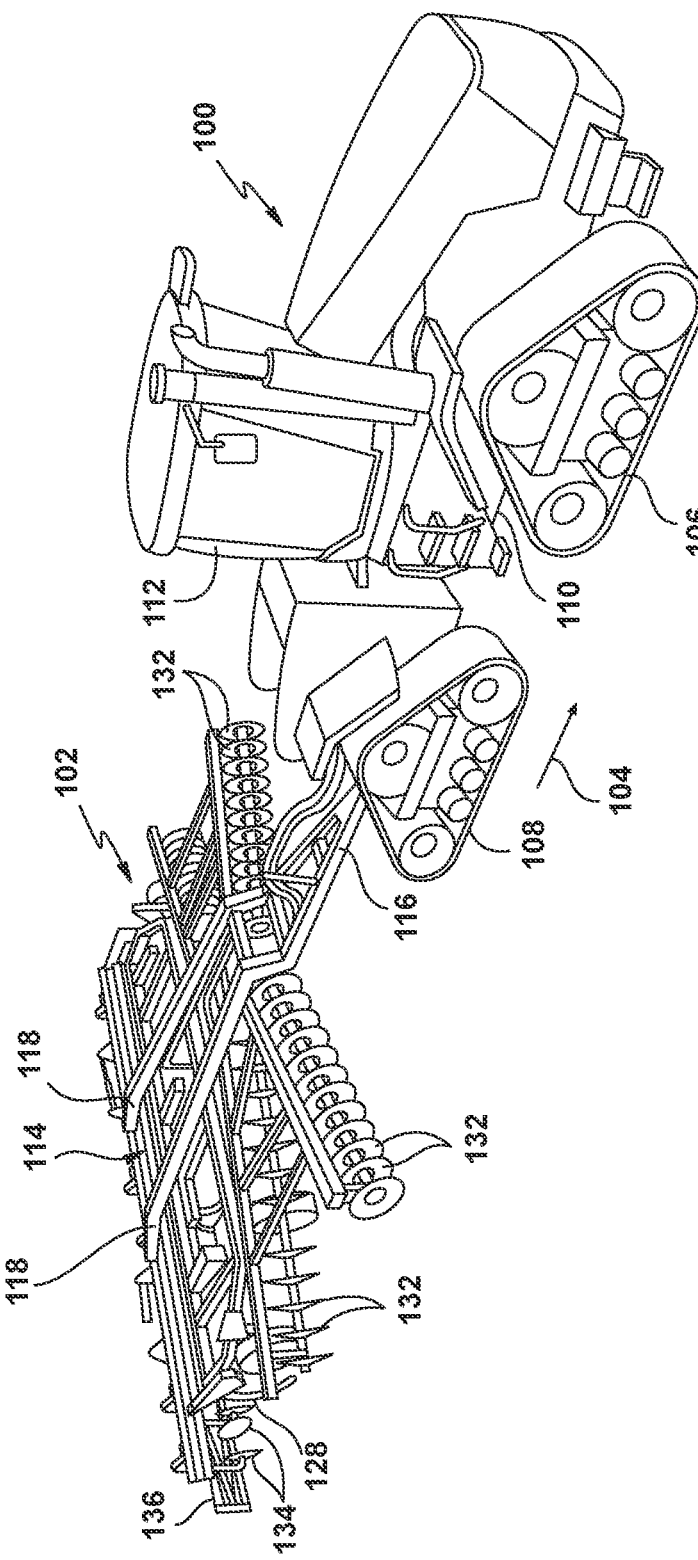
FIG. 2 illustrates a perspective view of one embodiment of a work vehicle towing an agricultural implement in accordance with aspects of the present subject matter.
Figure 3:
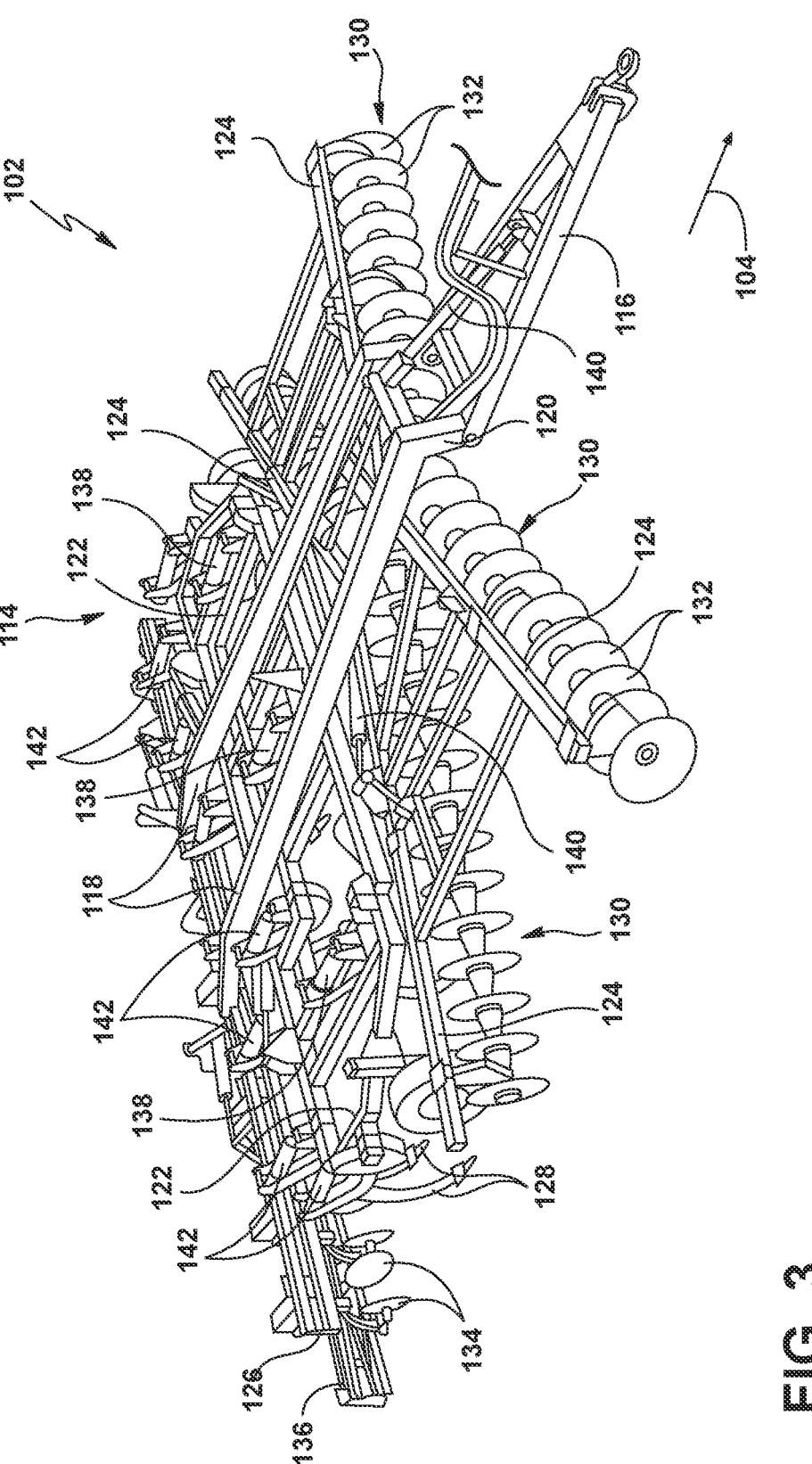
FIG. 3 illustrates a perspective view of the agricultural implement shown in FIG. 2.

FIGS. 2 and 3 illustrate perspective views of one embodiment of a work vehicle 100 and an associated agricultural implement 102 in accordance with aspects of the present subject matter. Specifically, FIG. 2 illustrates a perspective view of the work vehicle 100 towing the agricultural implement 102 across a field in a travel direction (e.g., as indicated by arrow 104). Additionally, FIG. 3 illustrates a perspective view of the agricultural implement 102 shown in FIG. 2.

As shown, in the illustrated embodiment, the work vehicle 100 is configured as an agricultural tractor and the agricultural implement 102 is configured as a tillage implement (e.g., a disk ripper). However, in other embodiments, the work vehicle 100 may be configured as any other suitable agricultural or other type of work vehicle. Similarly, in other embodiments, the agricultural implement 102 may be configured as any other suitable agricultural implement configured to be towed by a work vehicle, such as a seed-planting implement (e.g., a seeder, a planter, a side dresser, etc.).

As particularly shown in FIG. 2, the work vehicle 100 includes a pair of front track assemblies 106, a pair or rear track assemblies 108, and a frame or chassis 110 coupled to and supported by the track assemblies 106, 108. An operator's cab 112 may be supported by a portion of the chassis 110 and may house various input devices for permitting an operator to control the operation of one or more components of the work vehicle 100 and/or one or more components of the implement 102.

Additionally, as shown in FIGS. 2 and 3, the implement 102 may generally include a carriage frame assembly 114 configured to be towed by the work vehicle 100 via a pull hitch or tow bar 116 in the travel direction 104 of the vehicle/implement 100/102. In general, the carriage frame assembly 114 may support a plurality of ground-engaging tools, such as a plurality of shanks, disk blades, leveling blades, basket assemblies, tines, spikes, and/or the like. In several embodiments, the various ground-engaging tools may be configured to perform an agricultural operation, such as a tillage operation or any other suitable ground-engaging operation, across the field along which the implement 102 is being towed.

As particularly shown in FIG. 3, the carriage frame assembly 114 may include aft extending carrier frame members 118 coupled to the tow bar 116. In addition, reinforcing gusset plates 120 may be used to strengthen the connection between the tow bar 116 and the carrier frame members 118. In several embodiments, the carriage frame assembly 114 may generally support a central frame 122, a forward frame 124 positioned forward of the central frame 122 relative to the travel direction 104 of the vehicle/implement 100/102, and an aft frame 126 positioned aft of the central frame 122 relative to the travel direction 104 of the vehicle/implement 100/102. As shown, in one embodiment, the central frame 122 may correspond to a shank frame configured to support a plurality of ground-engaging shanks 128. In such an embodiment, the shanks 128 are configured to till or otherwise engage the soil as the implement 102 is towed across the field. However, in other embodiments, the central frame 122 may be configured to support any other suitable ground-engaging tools.

Additionally, as shown in FIG. 3, in one embodiment, the forward frame 124 may correspond to a disk frame configured to support various gangs or sets 130 of disk blades 132. Specifically, the disk blades 132 are spaced apart from each other along the length of the disk gang 130 and configured to rotate relative to the soil within the field as the agricultural implement 102 travels across the field in the travel direction 104. Furthermore, each disk blade 132 may include both a concave side (not shown) and a convex side (not shown). In addition, the various gangs 130 of disk blades 132 may be oriented at an angle relative to the travel direction 104 of the vehicle/implement 100/102 to promote more effective tilling of the soil. However, in other embodiments, the forward frame 124 may be configured to support any other suitable ground-engaging tools.

Moreover, like the central and forward frames 122, 124, the aft frame 126 may also be configured to support a plurality of ground-engaging tools. For instance, in the illustrated embodiment, the aft frame 126 is configured to support a plurality of leveling blades 134 and rolling (or crumbler) basket assemblies 136. However, in other embodiments, any other suitable ground-engaging tools may be coupled to and supported by the aft frame 126, such as a plurality of closing disk blades.

In addition, the implement 102 may also include any number of suitable ground-engaging tool actuators (e.g., hydraulic cylinders, electric linear actuators, etc.) for adjusting the relative positioning of, the penetration depth of, and/or the force being applied to the various ground-engaging tools 128, 132, 134, 136. For instance, the implement 102 may include one or more actuators 138 coupled to the central frame 122 for raising and/or lowering the central frame 122 relative to the ground, thereby allowing the penetration depth of and/or the force being applied to the shanks 128 to be adjusted. Similarly, the implement 102 may include one or more actuators 140 coupled to the forward frame 124 to adjust the positioning relative to the carriage frame assembly 114 of, the penetration depth of, and/or the force being applied to the disk blades 132. Moreover, the implement 102 may include one or more actuators 142 coupled to the aft frame 126 to allow the aft frame 126 to be moved relative to the central frame 122, thereby allowing the relevant operating parameters of the ground-engaging tools 134, 136 supported by the aft frame 126 (e.g., the force being applied to and/or the penetration depth of) to be adjusted.

Figure 4:
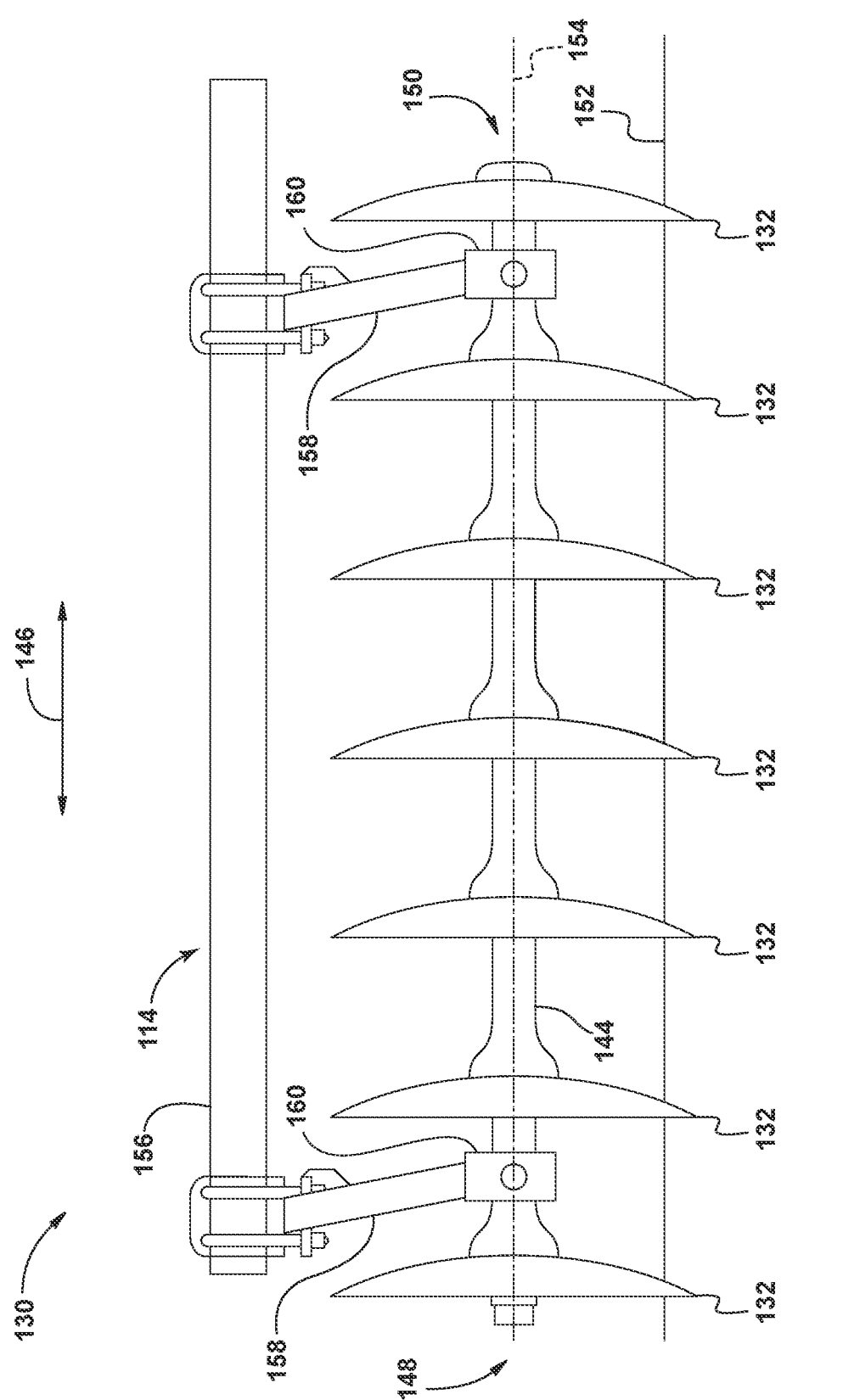
FIG. 4 illustrates a front view of one embodiment of a disk gang of an agricultural implement in accordance with aspects of the present subject matter.

Referring now to FIG. 4, a front view of one embodiment of one of the disk gangs 130 of the implement 102 is illustrated in accordance with aspects of the present subject matter. Specifically, in several embodiments, the disk gang 130 may include a disk gang shaft 144 that extends along an axial direction or length of the disk gang 130 (e.g., as indicated by arrow 146 in FIG. 4) between a first end 148 and a second end 150. As shown, the disk blades 132 are coupled to the disk gang shaft 144 and spaced apart from each other along the axial direction 146. As the implement 102 travels across a field, the disk blades 132 penetrate the soil surface (e.g., as indicated by line 152 in FIG. 4) of the field and rotate about an axis of rotation (e.g., as indicated by dashed line 154 in FIG. 4) relative to the soil within the field.

In general, the disk gang 130 is supported relative to a corresponding support arm 156 of the forward frame 124 of the agricultural implement 10. Specifically, in several embodiments, a pair of hangers 158 (e.g., C-hangers) support the disk gang 130 at a position below the support arm 156. For example, in one embodiment, one end of each hanger 158 may be coupled to the support arm 156, while the opposing end of each hanger 158 is coupled to a bearing block 160. The bearing blocks 160, in turn, are rotatably coupled to the disk gang shaft 144. However, in alternative embodiments, the disk gang 130 may have any other suitable configuration.

The configuration of the work vehicle 100 and the agricultural implement 102 described above and shown in FIGS. 2-4 is provided only to place the present subject matter in an exemplary field of use. Thus, the present subject matter may be readily adaptable to any manner of work vehicle and/or agricultural implement configuration.

Figure 5:
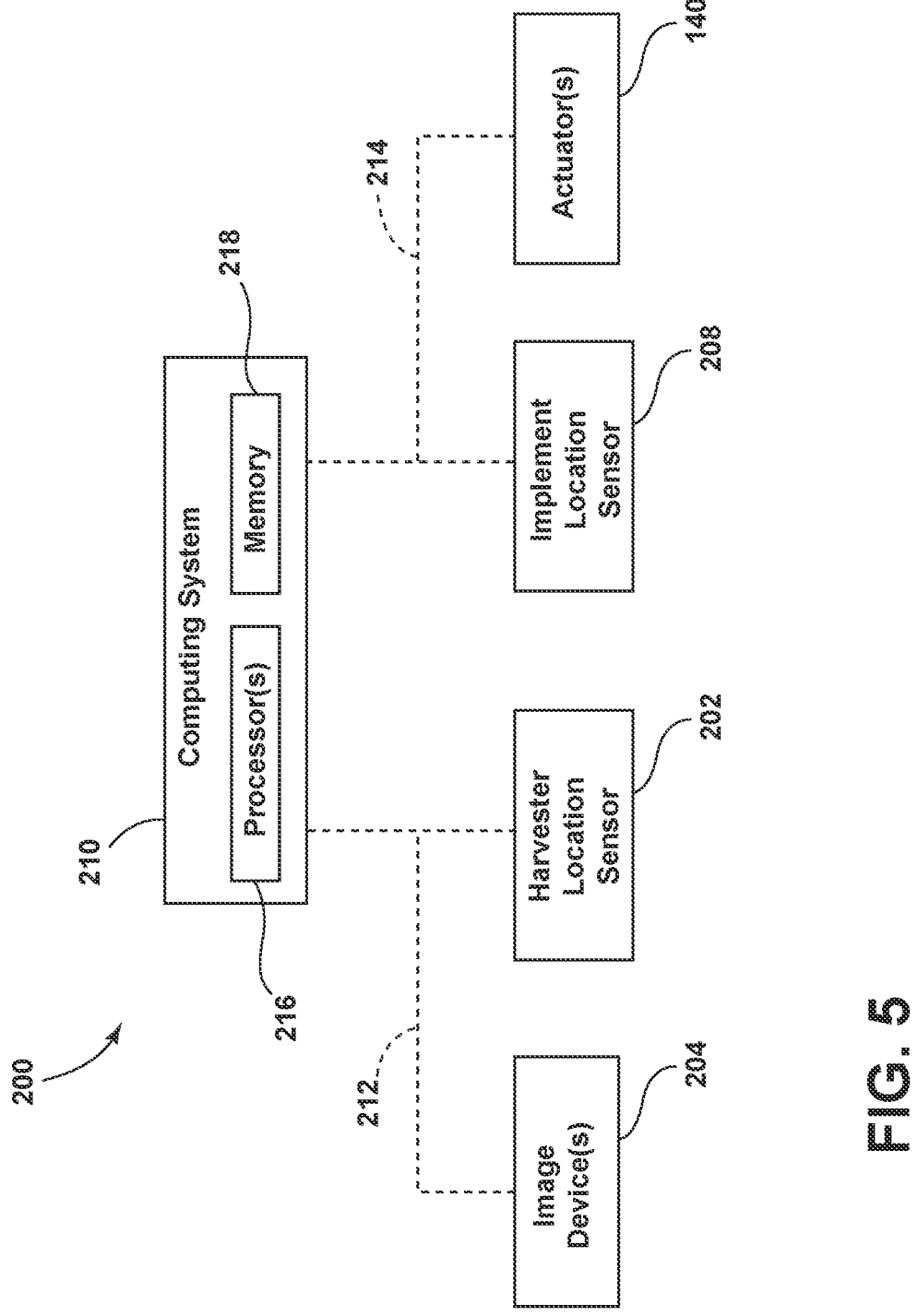
FIG. 5 illustrates a schematic view of one embodiment of a system for controlling the operation of an agricultural implement in accordance with aspects of the present subject matter.

Referring now to FIG. 5, a schematic view of one embodiment of a system 200 for controlling the operation of an agricultural implement is illustrated in accordance with aspects of the present subject matter. In general, the system 200 will be described herein with reference to the agricultural harvester described above with reference to FIG. 1 and the work vehicle 100 and the agricultural implement 102 described above with reference to FIGS. 2-4. However, it should be appreciated by those of ordinary skill in the art that the disclosed system 200 may generally be utilized with agricultural harvesters having any other suitable harvester configuration, work vehicles having any other suitable vehicle configuration, and/or agricultural implements having any other suitable implement configuration.

As shown in FIG. 5, an implement location sensor 208 may be provided in operative association with the vehicle 100 and/or the implement 102. In general, the implement location sensor 208 may be configured to determine the current location of the vehicle 100 and/or the implement 102 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the implement location sensor 208 may be transmitted to a computing system associated with the vehicle 100 and/or the implement 102 (e.g., in the form coordinates) and stored within the computing system's memory for subsequent processing and/or analysis. For instance, based on the known dimensional configuration and/or relative positioning between the vehicle 100 and the implement 102, the determined location from the implement location sensor 208 may be used to geo-locate the implement 102 within the field.

Furthermore, the system 100 includes a computing system 210 communicatively coupled to one or more components of the agricultural harvester 10, the work vehicle 100, the agricultural implement 102, and/or the system 200 to allow the operation of such components to be electronically or automatically controlled by the computing system 210. For instance, the computing system 210 may be communicatively coupled to the imaging device(s) 204 and the harvester location sensor 202 via a communicative link 212. As such, the computing system 210 may be configured to receive image data from the imaging device(s) 204 that is indicative of the corns stalks present within the field across which the harvester 10 is traveling. Additionally, the computing system 210 may be configured to receive location data (e.g., coordinates) from the harvester location sensor 202 that is indicative of the current location of the agricultural harvester 10 within the field. Moreover, the computing system 210 may be communicatively coupled to the implement location sensor 208 via a communicative link 214. As such, the computing system 210 may be configured to receive location data (e.g., coordinates) from the implement location sensor 208 that is indicative of the current location of the agricultural implement 102 within the field. In addition, the computing system 210 may be communicatively coupled to the actuator(s) 140 via the communicative link 214. In this respect, the computing system 210 may be configured to control the operation of the actuator(s) 150 to adjust the force being applied to, the penetration depth of, and/or the position relative to the carriage frame assembly 114 of the disk blades 132. Furthermore, the computing system 210 may be communicatively coupled to any other suitable components of the agricultural harvester 10, the work vehicle 100, the agricultural implement 102, and/or the system 200. For example, the computing system 210 may be communicatively coupled to the actuators 138, 142 of the agricultural implement 102 via the communicative link 214.

In general, the computing system 210 may comprise one or more processor-based devices, such as a given controller or computing device or any suitable combination of controllers or computing devices. Thus, in several embodiments, the computing system 210 may include one or more processor(s) 216 and associated memory device(s) 218 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 218 of the computing system 210 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 218 may generally be configured to store suitable computer-readable instructions that, when implemented by the processor(s) 216, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

The various functions of the computing system 210 may be performed by a single processor-based device or may be distributed across any number of processor-based devices, in which instance such devices may be considered to form part of the computing system 210. For example, in some embodiments, the computing system 210 may include one or more agricultural harvester-based controllers, one or more remote computing devices (e.g., a cloud-based computing device(s)), and one or more work vehicle- and/or agricultural implement-based controllers. In such embodiments, the functions of the computing system 210 may be distributed such controllers/computing devices. However, in alternative embodiments, the computing system 210 may include any suitable controller(s) or computing device(s) in addition or in lieu of the controllers and computing devices described above.

Figure 6:
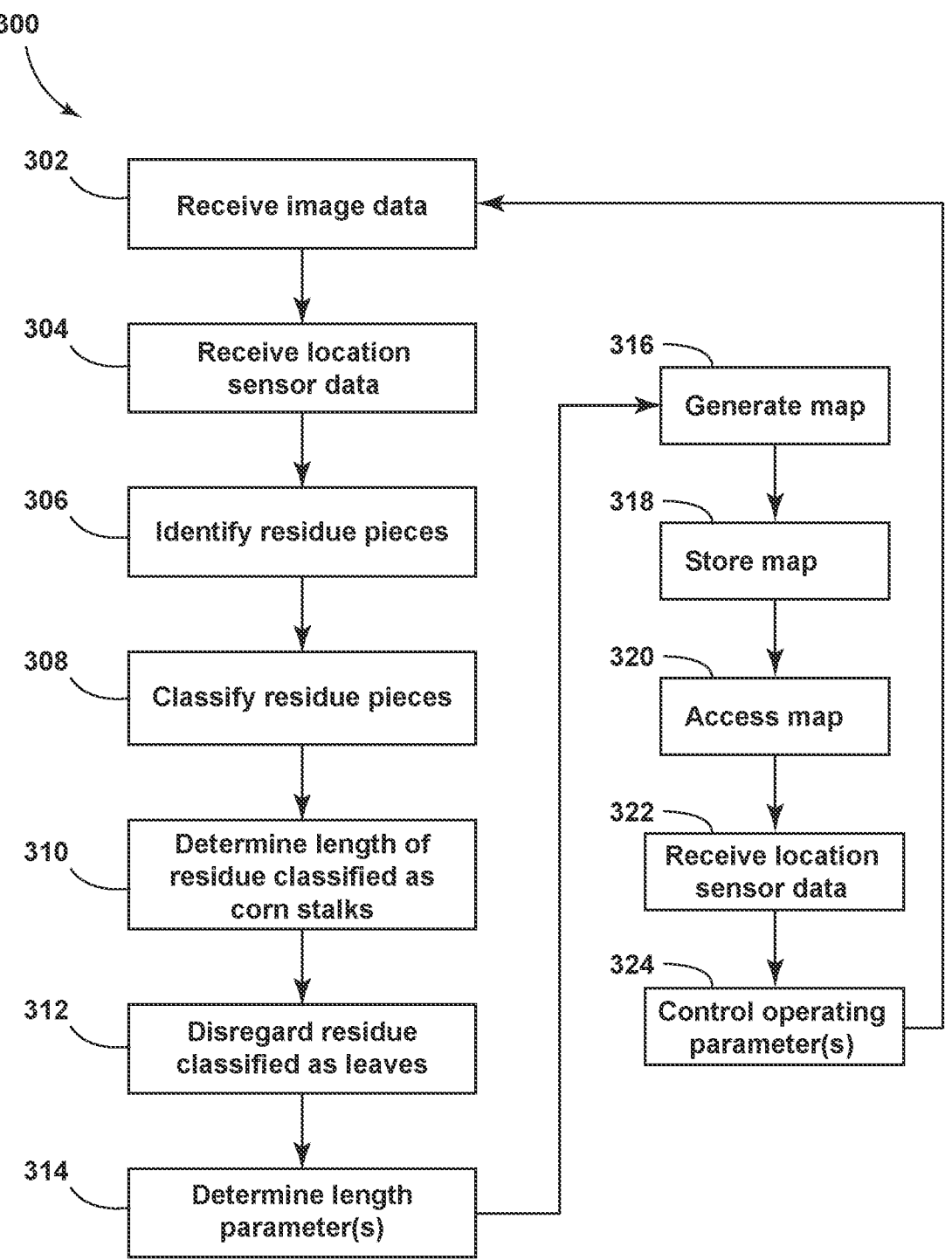
FIG. 6 illustrates a flow diagram providing one embodiment of control logic for controlling the operation of an agricultural implement in accordance with aspects of the present subject matter.

Referring now to FIG. 6, a flow diagram of one embodiment of control logic 300 that may be executed by the computing system 210 (or any other suitable computing system) for controlling the operation of an agricultural implement is illustrated in accordance with aspects of the present subject matter. Specifically, the control logic 300 shown in FIG. 6 is representative of steps of one embodiment of an algorithm that can be executed to control the operation of an agricultural implement in a manner that minimizes the number of corn stalks that wrap around components of the implement and interfere with the operation of the disk blades on the implement. However, in other embodiments, the control logic 300 may be used in association with any other suitable system, application, and/or the like for controlling the operation of an agricultural implement.

As shown, at (302), the control logic 300 includes receiving image data depicting a portion of a field across which an agricultural harvester is traveling. Specifically, as mentioned above, in several embodiments, the computing system 210 is communicatively coupled to the imaging device(s) 204 via the communicative link 212. In this respect, as the agricultural harvester 10 travels across the field to perform an agricultural harvesting operation thereon, the computing system 210 may receive image data from the imaging device(s) 204. Such image data, in turn, depicts the corn stalks and other residue pieces present on the surface of the imaged portion(s) of the field (e.g., the portion(s) of the field aft of the harvester 10).

Furthermore, at (304), the control logic 300 includes receiving location sensor data indicative of the current location of the agricultural harvester within the field. Specifically, as mentioned above, in several embodiments, the computing system 210 is communicatively coupled to the harvester location sensor 202 via the communicative link 212. In this respect, as the agricultural harvester 10 travels across the field, the computing system 210 may receive location sensor data (e.g., coordinates) from the harvester location sensor 202. Such location sensor data is, in turn, indicative of the current position of the agricultural harvester 10 within the field. As such, the computing system 210 may tag or otherwise associate the location sensor data with the image data received at (302) to geo-locate each image data within the field. For example, upon capture of an image at (302), the computing system 210 may tag such image with the coordinates received from the harvester location sensor 202 at the time of image capture. Thus, as will be described below, the image data received at (302) and the location sensor data received at (304) are used to generate a map identifying one or more length parameters associated with the corn stalks present on the field surface at a plurality of locations throughout the field.

Additionally, at (306), the control logic 300 includes identifying one or more pieces of residue present on the surface of the imaged portion of the field. Specifically, in several embodiments, the computing system 210 is configured to analyze the image data received at (302) to identify residue pieces present within the imaged portion(s) of the field depicted in the received image data. For example, the computing system 210 may use any suitable image processing algorithms or techniques to identify the residue pieces, such as color-based image processing algorithms, texture-based image processing algorithms, and/or the like.

Moreover, at (308), the control logic 300 includes classifying each of the identified one or more pieces of residue as having one of a corn stalk classification or a non-corn stalk classification. Specifically, in several embodiments, the computing system 210 is configured to analyze each piece of residue identified at (306) and classify such piece of residue as having a corn stalk classification or a non-corn stalk classification. In general, residue pieces having a corn stalk classification are corn stalks that have been severed from their root balls, while residue pieces having a non-corn stalk classification are leaves, straw; stubble, and/or other non-corn stalk residue pieces. In one embodiment, the computing system 210 may use the shape of each identified piece of residue to determine its classification. However, in other embodiments, the computing system 210 may determine the classifications of the residue pieces in any other suitable manner.

Figure 7:
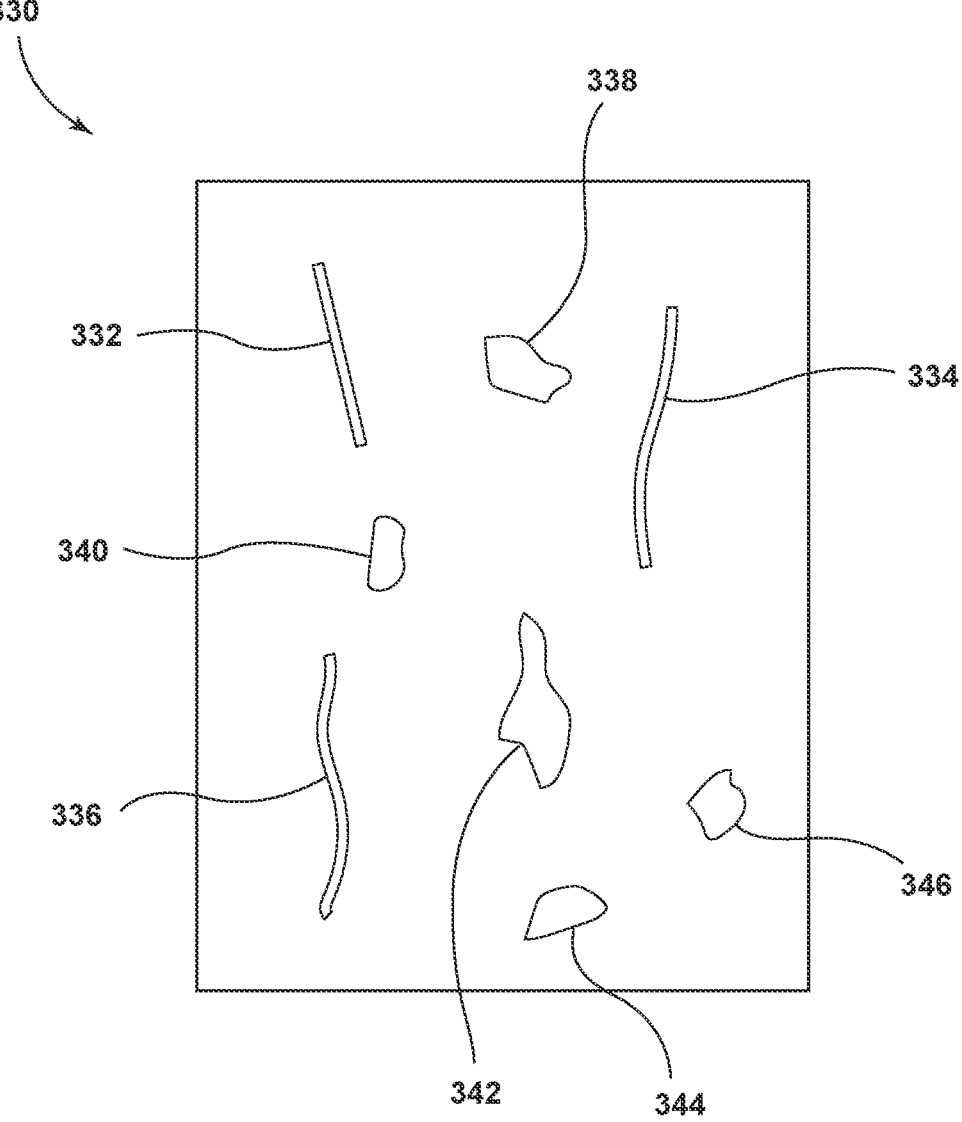
FIG. 7 illustrates an example view of an imaged portion of a field in accordance with aspects of the present subject matter, particularly illustrating pieces of residue being classified as a corn stalk or a non-corn stalk.

FIG. 7 illustrates an example view of an imaged portion of a field 330. In the example view, several pieces of residue, namely residue pieces 332, 334, 336, 338, 340, 342, 344, 346, have been identified in the imaged portion of the field 330. In general, corn stalks that have been severed from their root balls have a much greater length to width or aspect ratio than leaves, straw; stubble, and other types of residue. As shown, the residue pieces 332, 334, 336 have a much greater aspect ratio than the residue pieces 338, 340, 342, 344, 346. In this respect, the computing system 210 may classify the residue pieces 332, 334, 336 as having a corn stalk classification and the residue pieces 338, 340, 342, 344, 346 as having a non-corn stalk classification.

Referring again to FIG. 6, at (310), the control logic 300 includes determining the length of each identified piece of residue having the corn stalk classification. Specifically, in several embodiments, the computing system 210 is configured to analyze each residue piece determined to have a corn stalk classification at (308) to determine its length. As used herein, the length of a residue piece corresponds to its longest dimension. Conversely, the width of a residue piece corresponds to the dimension perpendicular to its length. As will be described below, the determined lengths of the pieces of residue having the corn stalk classification are used to determine one or more length parameters associated with the imaged portion(s) of the field.

Moreover, at (312), the control logic 300 includes disregarding each piece of residue having the non-corn stalk classification. Specifically, in several embodiments, the computing system 210 is configured to disregard each piece of residue determined to have the non-corn stalk classification at (308). As mentioned above, such residue pieces having a non-corn stalk classification are leaves, straw, stubble, and like. These types of residue, in turn, are unlikely to wrap around components of the agricultural implement 102, such as the disk gang shafts 144, the hangers 158, and/or the like. Thus, these pieces of residue can be ignored.

In addition, at (314), the control logic 300 includes determining a length parameter associated with the identified one or more corn stalks. Specifically, in several embodiments, the computing system 210 is configured to determine one or more length parameters associated with the identified corn stalks (e.g., the residue pieces having a corn stalk classification at (308)) present within the imaged portion(s) of the field based on the lengths determined at (310). As will be described below, the determined length parameter(s) is used to generate a map for controlling the operation of the disk blades 50 of the agricultural implement 102 during a subsequent agricultural operation to reduce the likelihood that the corn stalks will wrap around the disk gang shafts 56, the hangers 76, and/or components of the implement 102.

Any suitable length-based parameter(s) may be determined at (314). For example, in one embodiment, the length-based parameter(s) may include the average length of the identified corn stalks in an imaged portion of the field. Additionally, or alternatively, the length-based parameter(s) may include a distribution of the lengths of the identified corn stalks present in an imaged portion of the field (e.g., the number identified corn stalks having lengths within different size ranges). However, any other suitable length-based parameter(s) may be determined at (314).

Furthermore, at (316), the control logic 300 includes generating a field map identifying the determined length parameter at a plurality of locations within the field. Specifically, in several embodiments, the computing system 210 may generate a field map identifying the length parameter(s) associated with the corn stalks determined at (314) at a plurality of locations within the field based on the location sensor data received at (304). As will be described below, the field map may, in turn, be used to control the operation of the agricultural implement 102 during a subsequent agricultural operation (e.g., a subsequent tillage operation, planting operation, a fertilizing operation, etc.).

As used herein, a "map" may generally correspond to any suitable dataset that correlates data to various locations within a field. Thus, for example, a map may simply correspond to a data table that correlates the determined length parameter(s) to various locations within the field. Alternatively, a map may correspond to a more complex data structure, such as a geospatial numerical model or algorithm that can be used to identify the determined length parameter(s) at different locations within the field/work site.

Additionally, at (318), the control logic 300 includes storing the map. Specifically, in several embodiments, the computing system 210 may be configured to store the map generated at (316) within its memory device(s) 218 to for use during a subsequent agricultural operation, such as tillage operation.

As described above, the computing system 210 may include various controllers and/or computing devices. In this respect, the above-described steps of the control logic 300 may be performed by various controllers/computing devices of the computing system 210. For example, in some embodiments, (302) and (304) may be performed by one or more onboard controllers of the agricultural harvester 10, while (306)-(318) may be performed by one or more remote computing devices (e.g., a cloud-based computing device(s), a desktop/laptop computer in a farm management office, etc.). That is, in such embodiments, the onboard controller(s) of the agricultural harvester 10 may receive and geo-locate the image data depicting the field during harvester operation. The geo-located image data may be transmitted to the remote computing device(s) for analysis and generation/storage of the map. Alternatively, in other embodiments, (302)-(316) may be performed by the onboard controller(s) of the agricultural harvester 10, while (318) may be performed by the remote computing device(s). That is, in such embodiments, the onboard controller(s) of the agricultural harvester 10 may receive, geo-locate, and analyze the image data and generate the map during harvester operation. The map may be transmitted to the remote computing device(s) for storage. However, in further embodiments, any of the above-described steps of the control logic 300 may be performed by any other suitable controller(s)/computing device(s) of the computing system 210.

Moreover, at (320), the control logic 300 includes accessing the map. Specifically, in several embodiments, when an agricultural operation (e.g., a tillage operation) is being performed by the vehicle/implement 100/102, the computing system 210 may be configured to access the map stored at (318) from its memory device(s) 218. For example, in some embodiments, the stored map may be transmitted from the remote computing device(s) to one or more onboard controllers of the work vehicle 100 and/or the agricultural implement 102. As will be described below; the accessed map is then used to control one or more operating parameters of the disks 132 of the implement 102 during the agricultural operation.

In addition, at (322), the control logic 300 includes receiving location sensor data indicative of the current location of the agricultural implement within the field. Specifically, as mentioned above, in several embodiments, the computing system 210 is communicatively coupled to the implement location sensor 208 via the communicative link 214. In this respect, as the vehicle/implement 100/102 travels across the field to perform an agricultural operation (e.g., a tillage operation), the computing system 210 may receive location sensor data (e.g., coordinates) from the implement location sensor 208. Such location sensor data is, in turn, indicative of the current position of the agricultural implement 102 within the field.

Additionally, at (324), the control logic 300 includes controlling an operating parameter of the disk blade based on the accessed map and the received location sensor data. Specifically, in several embodiments, the computing system 210 is configured to control one or more operating parameters of the disk blades 132 of the agricultural implement 102 based on the map accessed (320) and the location data received at (322). For example, in some embodiments, the computing system 210 may determine the current location of the agricultural implement 102 within the field based on location data received at (322). The computing system 210 may then determine the operating parameter(s) for the disk blades 132 at the current location based on the map accessed at (320). Thereafter, the computing system 210 may transmit suitable control signals to the actuator(s) 140 of the agricultural implement 102 via the communicative link 214. The control signals may, in turn, instruct the actuator(s) 140 to adjust the operating parameter(s) of the disk blades 132.

Any suitable operating parameter(s) of the disk blades 132 may be adjusted or otherwise controlled at (324). For example, such operating parameter(s) may include the positioning of the disk blades 132 relative to the carriage frame assembly 114, the penetration depth(s) of the disk blades 132, and/or the force(s) being applied to the disk blades 132.

Such operating parameter adjustment(s) may reduce the lengths of the corn stalks present within the field, thereby reducing the likelihood that the corn stalks will wrap around the disk gang shafts 144, the hangers 158, and/or components of the implement 102. For example, when a large portion of the identified corn stalks have long lengths, the forces being applied to the disk blades 132 may be increased to cut the residue (and the corn stalks) into smaller pieces. Conversely, when a large portion of the identified corn stalks have short lengths, the forces being applied to the disk blades 132 may be reduced.

Referring now to FIG. 8, a flow diagram of one embodiment of a method 400 for controlling an operation of an agricultural implement is illustrated in accordance with aspects of the present subject matter. In general, the method 400 will be described herein with reference to the agricultural harvester 10, the work vehicle 100, the agricultural implement 102, and the system 200 described above with reference to FIGS. 1-7. However, it should be appreciated by those of ordinary skill in the art that the disclosed method 400 may generally be implemented with any agricultural harvester having any suitable harvester configuration, with any work vehicle having any suitable vehicle configuration, with any agricultural implement having any suitable implement configuration, and/or within any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (402), the method 400 includes accessing, with a computing system, a map identifying a length parameter at a plurality of locations within a field. For instance, as described above, the computing system 210 may be configured to access a map identifying one or more length parameters at a plurality of locations within the field. The length parameter(s) is, in turn, associated with corn stalks that have been severed from a corresponding root ball and are present on the surface of a portion of the field. In some embodiments, the map may be generated based on image data generated during a previous agricultural operation (e.g., by the imaging device(s) 204 mounted on the agricultural harvester 10)

Furthermore, at (404), the method 400 includes receiving, with the computing system, location sensor data indicative of the current location of an agricultural implement within the field. For instance, as described above, the computing system 210 may be configured to receive location sensor data from the implement location sensor 208. Such location data is, in turn, indicative of a current location of the agricultural implement 102 within the field.

Additionally, at (406), the method 400 includes controlling, with the computing system, an operating parameter of a disk blade of the agricultural implement based on the accessed map and the received location sensor data. For instance, as described above, the computing system 210 may be configured to control one or more operating parameters of the disk blades 132 of the agricultural implement 102 based on the accessed map and the received location sensor data. Such operating parameter(s) may, in turn, include the forces being applied to the disk blades 132, the penetration depths of the disk blades 132, and/or the positions of the disk blades 132 relative to the carriage frame assembly 114.

It is to be understood that the steps of the control logic 300 and the method 400 are performed by the computing system 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 210 described herein, such as the control logic 300 and the method 400, is implemented in software code or instructions which are tangibly stored on a tangible computer readable medium. The computing system 210 loads the software code or instructions via a direct interface with the computer readable medium or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
   a frame;
   a disk blade supported on the frame, the disk blade configured to rotate relative to soil in a field across which the agricultural implement is traveling;
   an imaging device configured to generate image data depicting a portion of the field positioned forward of the disk blade relative to a travel direction of the agricultural implement; and
   a computing system communicatively coupled to the imaging device, wherein the computing system:
      identifies one or more pieces of residue present on a surface of the imaged portion of the field;
      classifies each of the identified one or more pieces of residue as having one of a corn stalk classification or a non-corn stalk classification;
      determines a length of each identified piece of residue having the corn stalk classification;
      determines a length parameter based on the determined lengths;
      generates a map identifying the determined length parameter at a plurality of locations within the field;

accesses the map;
      receives location sensor data indicative of a current location of the agricultural implement within the field; and
      controls an operating parameter of the disk blade based on the accessed map and the received location sensor data.

2. The agricultural implement of claim 1, wherein the length parameter comprises an average length.

3. The agricultural implement of claim 1, wherein the length parameter comprises a length distribution.

4. The agricultural implement of claim 1, wherein the operating parameter comprises at least one of a force being applied to the disk blade, a penetration depth of the disk blade, or a position of the disk blade relative to a frame of the agricultural implement.

5. The agricultural implement of claim 1, wherein the image data was generated during a previous agricultural operation.

6. The system of claim 1, wherein the imaging device is mounted on an agricultural harvester.

7. A system for controlling an operation of an agricultural implement, the system comprising:
   a disk blade configured to rotate relative to soil in a field across which the agricultural implement is traveling;
   an imaging device configured to generate image data depicting a portion of the field positioned forward of the disk blade relative to a travel direction of the agricultural implement; and
   a computing system communicatively coupled to the imaging device, wherein the computing system:
      identifies one or more pieces of residue present on a surface of the imaged portion of the field;
      classifies each of the identified one or more pieces of residue as having one of a corn stalk classification or a non-corn stalk classification;
      determines a length of each identified piece of residue having the corn stalk classification;
      determines a length parameter based on the determined lengths;
      generates a map identifying the determined length parameter at a plurality of locations within the field;
      accesses the map;
      receives location sensor data indicative of a current location of the agricultural implement within the field; and
      controls an operating parameter of the disk blade based on the accessed map and the received location sensor data.

8. The system of claim 7, wherein the length parameter comprises an average length.

9. The system of claim 7, wherein the length parameter comprises a length distribution.

10. The system of claim 7, wherein the operating parameter comprises at least one of a force being applied to the disk blade, a penetration depth of the disk blade, or a position of the disk blade relative to a frame of the agricultural implement.

11. The system of claim 7, wherein, when determining the length parameter, the computing system disregards each piece of residue having the non-corn stalk classification.

12. A method for controlling an operation of an agricultural implement, the agricultural implement including a disk blade configured to rotate relative to soil in a field across which the agricultural implement is traveling, the method comprising:

receiving, with a computing system, image data depicting a portion of the field positioned forward of the disk blade relative to a travel direction of the agricultural implement;

identifying, with the computing system, one or more pieces of residue present on a surface of the imaged portion of the field;

classifying, with the computing system, each of the identified one or more pieces of residue as having one of a corn stalk classification or a non-corn stalk classification;

determining, with the computing system, a length of each identified piece of residue having the corn stalk classification;

determining, with the computing system, a length parameter based on the determined lengths;

generating, with the computing system, a map identifying the determined length parameter at a plurality of locations within the field;

accessing, with the computing system, the map;

receiving, with the computing system, location sensor data indicative of a current location of the agricultural implement within the field; and controlling, with the computing system, an operating parameter of the disk blade based on the accessed map and the received location sensor data.

13. The method of claim 12, wherein the length parameter comprises an average length.

14. The method of claim 12, wherein the length parameter comprises a length distribution.

15. The method of claim 12, wherein the operating parameter comprises at least one of a force being applied to the disk blade, a penetration depth of the disk blade, or a position of the disk blade relative to a frame of the agricultural implement.

16. The method of claim 12, wherein the image data was generated during a previous agricultural operation.

* * * * *